United States Patent
Coussirou et al.

(10) Patent No.: US 12,018,582 B2
(45) Date of Patent: Jun. 25, 2024

(54) TURBINE BLADE FOR AN AIRCRAFT TURBINE ENGINE, COMPRISING A PLATFORM PROVIDED WITH A CHANNEL FOR PRIMARY FLOW REJECTION TOWARDS A PURGE CAVITY

(71) Applicant: SAFRAN AIRCRAFT ENGINES, Paris (FR)

(72) Inventors: Jean Charles Marie Coussirou, Moissy-Cramayel (FR); Nour Cherkaoui, Moissy-Cramayel (FR); Arnaud Lasantha Genilier, Moissy-Cramayel (FR); Rémi Philippe Oswald Olive, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 20 days.

(21) Appl. No.: 18/247,282

(22) PCT Filed: Oct. 1, 2021

(86) PCT No.: PCT/FR2021/051704
§ 371 (c)(1),
(2) Date: Mar. 30, 2023

(87) PCT Pub. No.: WO2022/069845
PCT Pub. Date: Apr. 7, 2022

(65) Prior Publication Data
US 2023/0383656 A1  Nov. 30, 2023

(30) Foreign Application Priority Data
Oct. 1, 2020 (FR) ........................................ 2010052

(51) Int. Cl.
*F01D 5/14* (2006.01)
*F01D 11/08* (2006.01)

(52) U.S. Cl.
CPC ................ *F01D 5/14* (2013.01); *F01D 11/08* (2013.01); *F05D 2230/00* (2013.01); *F05D 2240/55* (2013.01)

(58) Field of Classification Search
CPC ........ F01D 5/14; F01D 11/08; F05D 2230/00; F05D 2240/55; F05D 2240/81
See application file for complete search history.

(56) References Cited

U.S. PATENT DOCUMENTS 9,739,157 B2 *  8/2017  Uskert .................... F01D 5/282
10,030,523 B2 *  7/2018  Quach ...................... F01D 5/18
(Continued)

FOREIGN PATENT DOCUMENTS

| | | |
|---|---|---|
| DE | 19524984 A1 | 1/1997 |
| EP | 2138727 A2 | 12/2009 |

(Continued)

OTHER PUBLICATIONS

International Search Report for issued in Application No. PCT/FR2021/051704 dated Jan. 24, 2022.
Written Opinion for PCT/FR2021/051704 dated Jan. 24, 2022.

*Primary Examiner* — Sang K Kim
(74) *Attorney, Agent, or Firm* — Pearne & Gordon LLP

(57) ABSTRACT

A turbine blade for a turbine engine, including an aerofoil and a platform. The platform includes an internal channel having a suction opening which opens on a first surface of an upstream portion of the platform, this first surface defining a primary duct. The internal channel includes an ejection opening which opens on a second surface of a downstream portion of the platform, this second surface defining a purge cavity. The internal channel makes it possible to suck in a part of a fluid circulating in the primary duct so as to reduce the intensity of secondary flows which result from friction of the fluid on the first surface.

10 Claims, 6 Drawing Sheets

(56) References Cited

U.S. PATENT DOCUMENTS

| | | | |
|---|---|---|---|
| 10,167,726 B2 * | 1/2019 | Devore | F01D 25/12 |
| 10,215,051 B2 * | 2/2019 | Thomen | F04D 29/542 |
| 10,221,694 B2 * | 3/2019 | Snyder | F01D 9/02 |
| 10,465,523 B2 * | 11/2019 | Devore | F01D 5/18 |
| 10,801,333 B2 * | 10/2020 | Jennings | F01D 9/02 |
| 11,187,087 B2 * | 11/2021 | Lee | F01D 5/187 |
| 11,560,802 B2 * | 1/2023 | Otomo | F01D 25/12 |
| 2022/0268211 A1 * | 8/2022 | Matsuo | F01D 9/065 |

FOREIGN PATENT DOCUMENTS

| | | |
|---|---|---|
| EP | 3508697 A1 | 7/2019 |
| WO | 2019239064 A1 | 12/2019 |

\* cited by examiner

TURBINE BLADE FOR AN AIRCRAFT TURBINE ENGINE, COMPRISING A PLATFORM PROVIDED WITH A CHANNEL FOR PRIMARY FLOW REJECTION TOWARDS A PURGE CAVITY

This is the National Stage of PCT international application PCT/FR2021/051704, filed on Oct. 1, 2021 entitled "TURBINE BLADE FOR AN AIRCRAFT TURBINE ENGINE, COMPRISING A PLATFORM PROVIDED WITH A CHANNEL FOR PRIMARY FLOW REJECTION TOWARDS A PURGE CAVITY", which claims the priority of French Patent Application No. 2010052 filed Oct. 1, 2020, both of which are incorporated herein by reference in their entireties.

TECHNICAL FIELD

The invention relates to the field of turbines for an aircraft turbine engine.

The invention more specifically relates to a blade for a nozzle or rotor wheel of such a turbine.

PRIOR ART

A turbine of a conventional aircraft turbine engine comprises one or more stages, each consisting of a nozzle and a rotor wheel. The nozzle comprises fixed blades connected at the radially outer end thereof to a casing and which are distributed circumferentially about a longitudinal central axis of the turbine so as to form a stator ring. The rotor wheel comprises a disc and blades connected to the disc at the radially inner end thereof and which are circumferentially distributed about the disc. The nozzle of a stage is configured such that a fluid flow entering this stage, typically comprising gases from a combustion chamber, is accelerated and deflected by the stator blades towards the blades of the rotor wheel of this stage so as to drive it such that it rotates about the longitudinal central axis. In general, each nozzle blade and rotor wheel blade of the turbine comprises an aerofoil and two platforms which radially delimit therebetween a circumferential portion of an annular primary duct into which the aerofoil extends. The fluid passing through the turbine mainly flows through this primary duct.

When operating a conventional turbine, the interaction of the fluid with the nozzles and rotor wheels produces vortices at the blade platforms, forming so-called "secondary flows". To illustrate this phenomenon, FIG. 1 shows a part of two blades 1A and 1B of a turbine nozzle 1, these blades 1A and 1B being circumferentially adjacent to one another. FIG. 1 more particularly shows a radially lower part of an aerofoil 2 and a platform 3 of each of the blades 1A and 1B. The aerofoil 2 of each blade 1A and 1B comprises a leading edge 4, a trailing edge 5, a pressure face 6 and a suction face 7. The platform 3 of each blade 1A and 1B radially inwardly delimits a circumferential portion of an annular primary duct in which a fluid flows in a direction S1 from the leading edge 4 to the trailing edge 5 of the aerofoils 2.

Given the typical viscosity of the fluid flowing in the primary duct of a turbine, the flow thereof along the surface of the platforms 3 has a velocity gradient GV1 such that, in the vicinity of this surface, the velocity of a layer of fluid slows the closer this layer is to this surface. The fluid flowing in the primary duct is also subject to a pressure gradient GP1 oriented, in this example, from the pressure face 6 of the aerofoil 2 of the blade 1B towards the suction face 7 of the aerofoil 2 of the blade 1A. The pressure gradient GP1 is generally sufficient to deflect the layers of fluid flowing in the vicinity of the surface of the platforms 3.

This results in the appearance of different types of vortices. A first type of vortex T1, referred to as "horseshoe vortices", takes the form of two counter-rotating legs distributed on either side of the aerofoils 2. A second type of vortex T2, referred to as "passage vortices", develops between two adjacent aerofoils 2. A third type of vortex T3, referred to as "corner vortices", runs along the connecting lines between the aerofoil 2 and the platform 3 of each blade.

Such secondary flows T1, T2 and T3, which typically occur at the root and tip of the aerofoils 2, are not oriented in the main direction of flow S1 of the fluid passing through the primary duct and thus reduce the efficiency and increase the kerosene consumption of the turbine engine.

Similar secondary flows also occur in the turbine rotor wheels.

DESCRIPTION OF THE INVENTION

The invention aims to provide a blade capable of limiting the formation of such secondary flows or of reducing the intensity thereof.

To this end, the invention relates to a turbine blade for a turbine engine intended to be mounted about an axis, comprising an aerofoil and at least one platform, the platform comprising a first surface from which the aerofoil extends and intended to delimit a primary duct into which the aerofoil extends in order to receive a fluid flowing in a direction from a leading edge to a trailing edge of the aerofoil and from an upstream part to a downstream part of the platform, the platform comprising a second surface radially opposite the first surface and intended to delimit a purge cavity. According to the invention, the platform comprises at least one internal channel having at least one suction opening that opens out onto the first surface of the upstream part of the platform and at least one ejection opening that opens out onto the second surface of the downstream part of the platform.

Such an internal channel allows a part of the fluid flowing along the first surface of the platform to be sucked in and prevents this part of fluid from contributing to the formation of secondary flows.

The invention thus limits the formation of secondary flows and reduces the intensity of the secondary flows that may nevertheless occur, thereby improving the efficiency and reducing the kerosene consumption of the turbine engine.

The fluid flowing in the primary duct and reaching the at least one suction opening is in effect sucked into the at least one internal channel given the static pressure differential between the region of the primary duct surrounding the at least one suction opening and the region of the purge cavity surrounding the at least one ejection opening.

In an operating turbine, the static pressure is in effect substantially lower downstream of a blade aerofoil than it is upstream of this aerofoil, and it is substantially the same downstream of this aerofoil and in the corresponding purge cavity. As a result, the static pressure in the purge cavity at the at least one ejection opening is substantially lower than in the primary duct at the at least one suction opening.

The at least one internal channel thus forms a passive suction system which does not require any additional suction device, for example a mechanically- or electrically-operated device.

Moreover, ejecting the fluid conveyed by the at least one internal channel into the purge cavity rather than into the primary duct avoids or reduces any disruption to the main flow passing through the primary duct.

The invention thus allows the formation and/or intensity of the secondary flows to be reduced, while avoiding the generation of mixing losses such as those which would result from a direct reintroduction, within the primary duct, of the fluid thus sucked in.

Furthermore, the part of the fluid thus ejected into the purge cavity contributes to driving the rotor of the turbine since, in a manner known per se, the purge cavity is fluidly connected to the primary duct.

In particular, when the blade belongs to a nozzle of the turbine, the part of the fluid thus ejected into the purge cavity constitutes a part of the fluid flow driving the rotor wheel of the same stage, the purge cavity located downstream of a nozzle being fluidly connected to the primary duct upstream of the rotor wheel of the same stage.

Preferably, the upstream part of the platform is delimited by an imaginary line located equidistant from the leading edge and from the trailing edge of the aerofoil.

According to a first alternative embodiment, at least one of the one or more suction openings is positioned upstream of the leading edge of the aerofoil relative to the direction of fluid flow within the primary duct.

According to a second alternative embodiment, at least one of the one or more suction openings is positioned, relative to the direction of fluid flow within the primary duct, downstream of the leading edge of the aerofoil and upstream of the trailing edge of the aerofoil.

The first and second alternative embodiments can be combined.

For example, according to a third alternative embodiment, at least one of the suction openings is positioned upstream of the leading edge of the aerofoil relative to the direction of fluid flow within the primary duct and at least one other of said suction openings is positioned, relative to the direction of fluid flow within the primary duct, downstream of the leading edge of the aerofoil and upstream of the trailing edge of the aerofoil.

In one embodiment, the platform comprises a plurality of internal channels that are fluidly independent of one another.

In another embodiment, the platform comprises a plurality of internal channels fluidly connected to one another.

The platform can further comprise a first internal channel and a series of other internal channels fluidly connected to one another and fluidly independent of the first internal channel.

Alternatively, the platform can comprise a first series of internal channels fluidly independent of one another and a second series of internal channels fluidly connected to one another and fluidly independent of the first series of internal channels.

In one embodiment, the blade comprises one or more vanes configured to orient, in an ejection orientation, a fraction of the fluid exiting the at least one internal channel of the platform through the one or more ejection openings.

In one embodiment, the at least one suction opening is disposed on the side of a pressure face of the aerofoil.

The invention further relates to a turbine for a turbine engine.

In one embodiment, the turbine comprises a nozzle comprising at least one blade as defined hereinabove.

In one embodiment, the turbine comprises a rotor wheel comprising at least one blade as defined hereinabove.

It goes without saying that the turbine can comprise one or more nozzles and one or more rotor wheels, each comprising at least one blade as defined hereinabove.

In one embodiment, the turbine comprises a rotor, a stator and a dynamic seal, the rotor and/or stator comprising at least one blade as defined above, the dynamic seal comprising a wear part integral with the stator and at least one knife edge integral with the rotor, the turbine being configured such that the knife edge delimits upstream said purge cavity.

The invention further relates to a turbine engine comprising a turbine as defined hereinabove.

According to another aspect, the invention relates to a method for manufacturing a blade as defined hereinabove.

Preferably, this method comprises a step of additive manufacturing this blade.

Other advantages and features of the invention will appear upon reading the detailed, non-limiting description that follows.

BRIEF DESCRIPTION OF THE DRAWINGS

The following detailed description refers to the accompanying drawings in which.

DETAILED DESCRIPTION OF SOME EMBODIMENTS

The figures comprise a reference frame L, R and C respectively defining longitudinal (or axial), radial and circumferential directions, which are orthogonal to one another.

Figure 1:
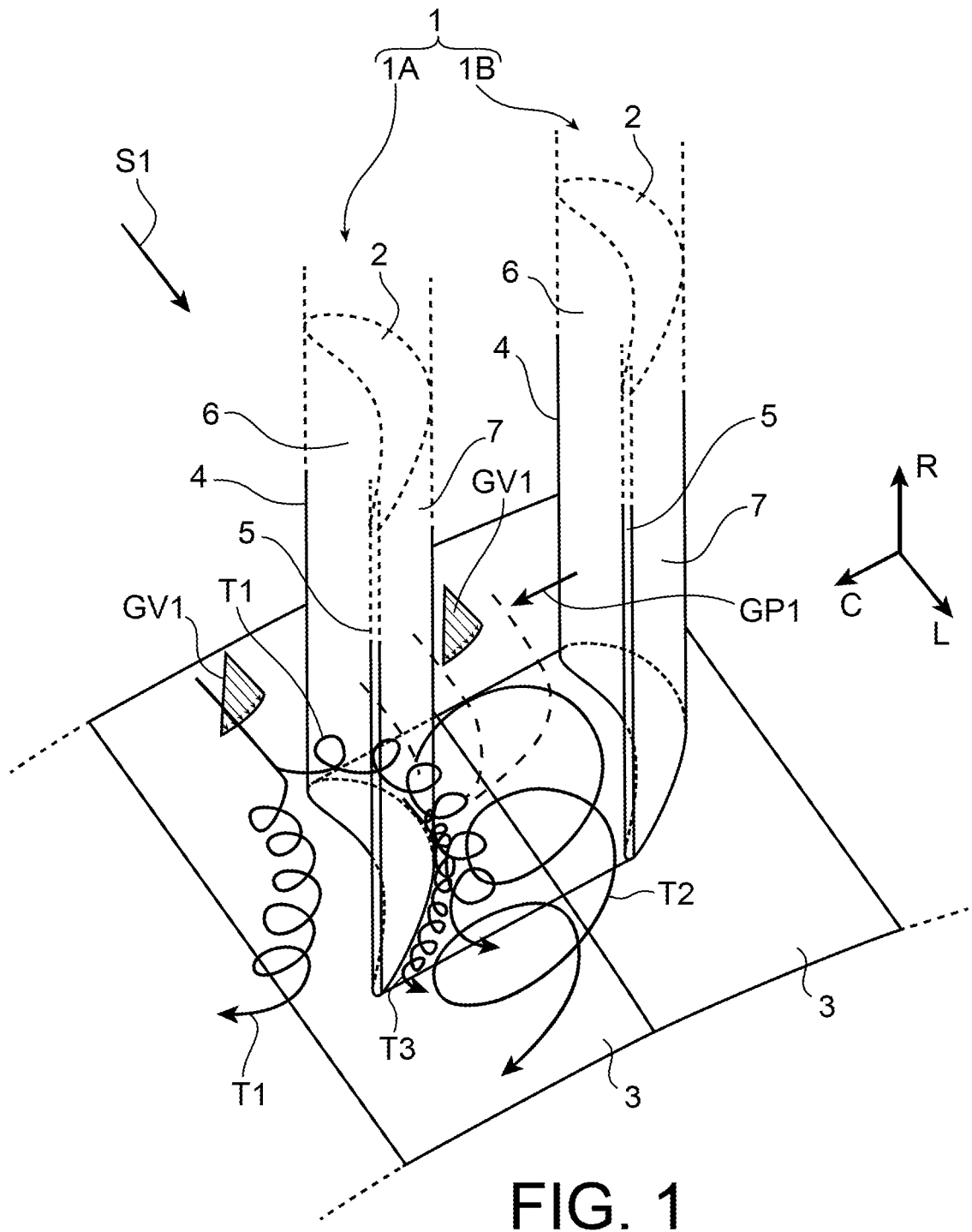
FIG. 1 is a diagrammatic, partial, perspective view, which has already been described hereinabove, of a conventional turbine nozzle for an aircraft turbine engine, illustrating secondary flows that occur during turbine operation.
Figure 2:
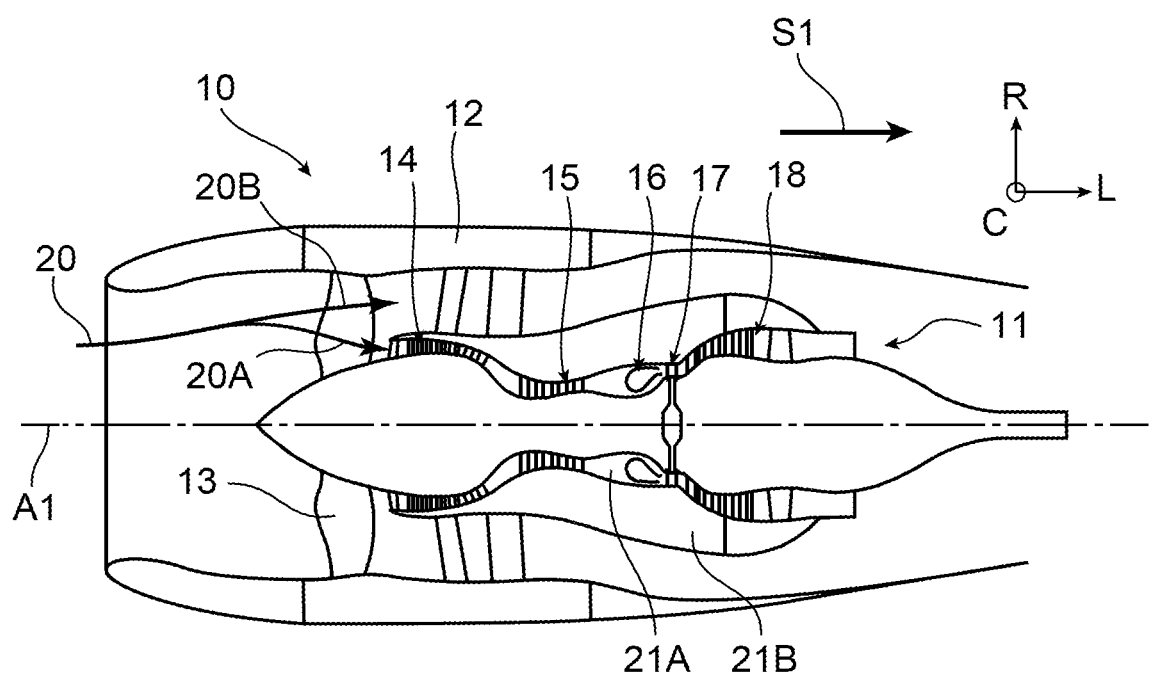
FIG. 2 is a diagrammatic, axial sectional view of an aircraft propulsion unit.

FIG. 2 shows an aircraft propulsion unit 10 comprising a turbine engine 11 faired by a nacelle 12. In this example, the turbine engine 11 is a twin-spool turbofan engine.

The terms "upstream" and "downstream" will hereafter be defined with respect to a direction S1 of gas flow through the propulsion unit 10 when it is propelled.

The turbofan engine 11 has a longitudinal central axis A1 about which the various components thereof extend, in this case, from upstream to downstream, a fan 13, a low-pressure compressor 14, a high-pressure compressor 15, a combustion chamber 16, a high-pressure turbine 17 and a low-pressure turbine 18. The compressors 14 and 15, the combustion chamber 16 and the turbines 17 and 18 form a gas generator.

During operation of the turbofan engine 11, an air flow 20 enters the propulsion unit 10 through the air inlet upstream of the nacelle 12, passes through the fan 13 and then splits into a central primary flow 20A and a secondary flow 20B. The primary flow 20A flows in a primary gas circulation duct 21A through the gas generator. In turn, the secondary flow 20B flows in a secondary duct 21B surrounding the gas generator and radially outwardly delimited by the nacelle 12.

In one example embodiment, the low-pressure turbine 18 is as described hereinbelow with reference to FIG. 3, which shows the turbine 18 in a radial plane comprising the longitudinal central axis A1.

The longitudinal central axis A1 is also the axis of rotation of the rotor of this turbine 18. In this example, the turbine 18 comprises four stages, each comprising a nozzle 25 and a rotor wheel 26.

In a manner known per se, the rotor wheels 26 are assembled axially to one another by annular flanges 27 and form the rotor of the turbine 18. The nozzles 25 are connected to a casing 28 to form the stator of the turbine 18.

Each nozzle 25 comprises a plurality of blades 30 circumferentially distributed about the axis A1. With reference to the nozzle 25 of the last stage of the turbine 18, of which only one blade 30 is shown in FIG. 3, each of the blades 30 comprises an aerofoil 31, an inner platform 32 and an outer platform 33. Each of the blades 30 is connected to the casing 28 by an attachment element integral with the outer platform 33 thereof.

Each rotor wheel 26 comprises a disc 35 and a plurality of blades 36 circumferentially distributed about the axis A1. With reference to the rotor wheel 26 of the last stage of the turbine 18, of which only one blade 36 is shown in FIG. 3, each of the blades 36 comprises an aerofoil 37, an inner platform 38 and an outer platform 39. Each of the blades 36 is connected to the disc 35 by a root integral with the inner platform 38 thereof.

For each blade 30 of a nozzle 25, each of the platforms 32 and 33 comprises a first surface from which the aerofoil 31 extends and which delimits a circumferential portion of the primary duct 21A through which the primary flow 20A flows. Thus, the first surface of the inner platform 32 of each blade 30 radially inwardly delimits the primary duct 21A, whereas the first surface of the outer platform 33 of each blade 30 radially outwardly delimits the primary duct 21A.

Similarly, for each blade 36 of a rotor wheel 26, each of the platforms 38 and 39 comprises a first surface from which the aerofoil 37 extends and which delimits a circumferential portion of the primary duct 21A. Thus, the first surface of the inner platform 38 of each blade 36 radially inwardly delimits the primary duct 21A, whereas the first surface of the outer platform 39 of each blade 36 radially outwardly delimits the primary duct 21A.

Figure 3:
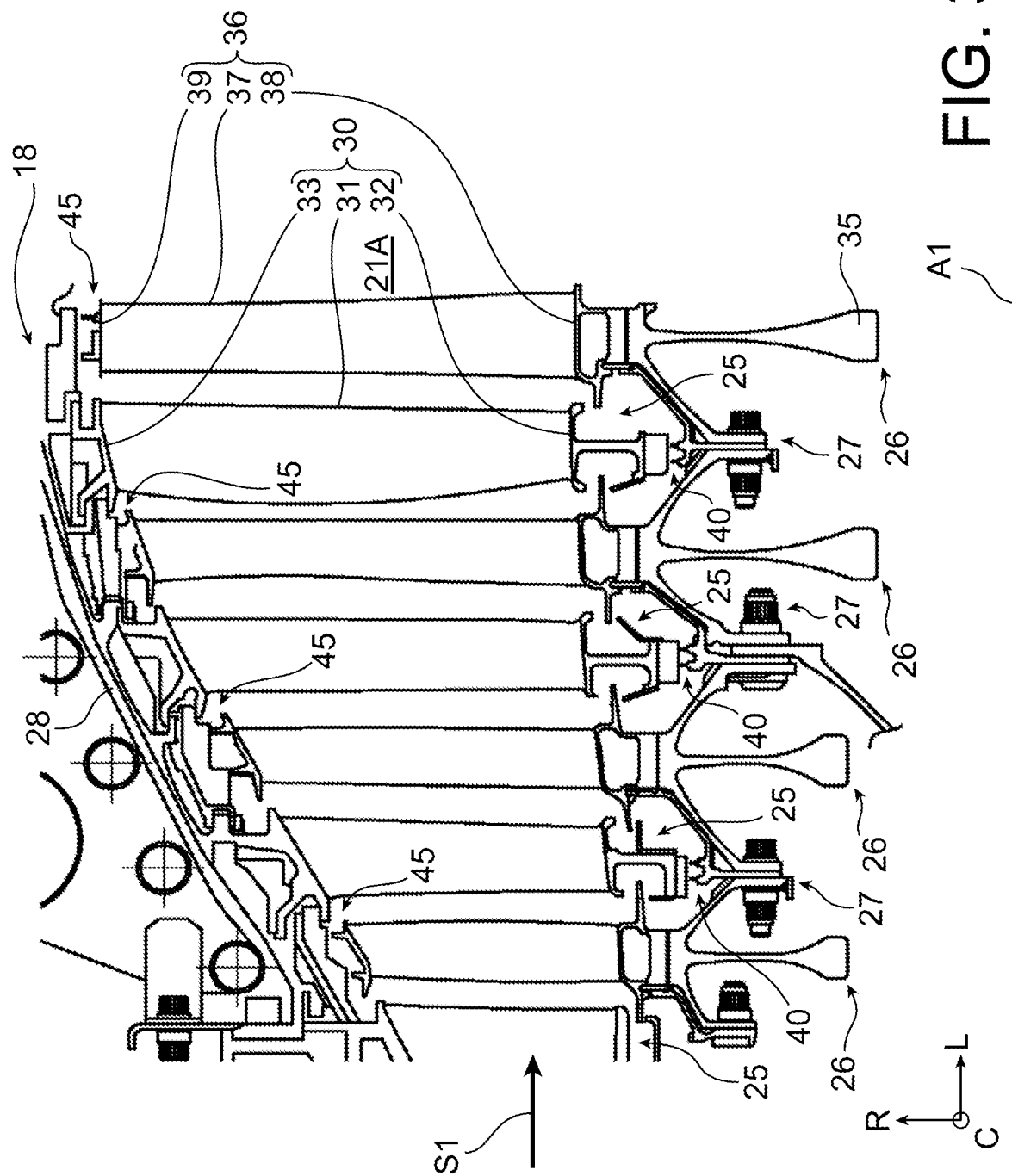
FIG. 3 is a diagrammatic, partial, axial sectional half-view of a turbine engine low-pressure turbine.

In the turbine 18 of FIG. 3, the primary duct 21A is thus annular overall.

In another example embodiment, the low-pressure turbine 18 is as described hereinbelow with reference to FIG. 4.

Figure 4:
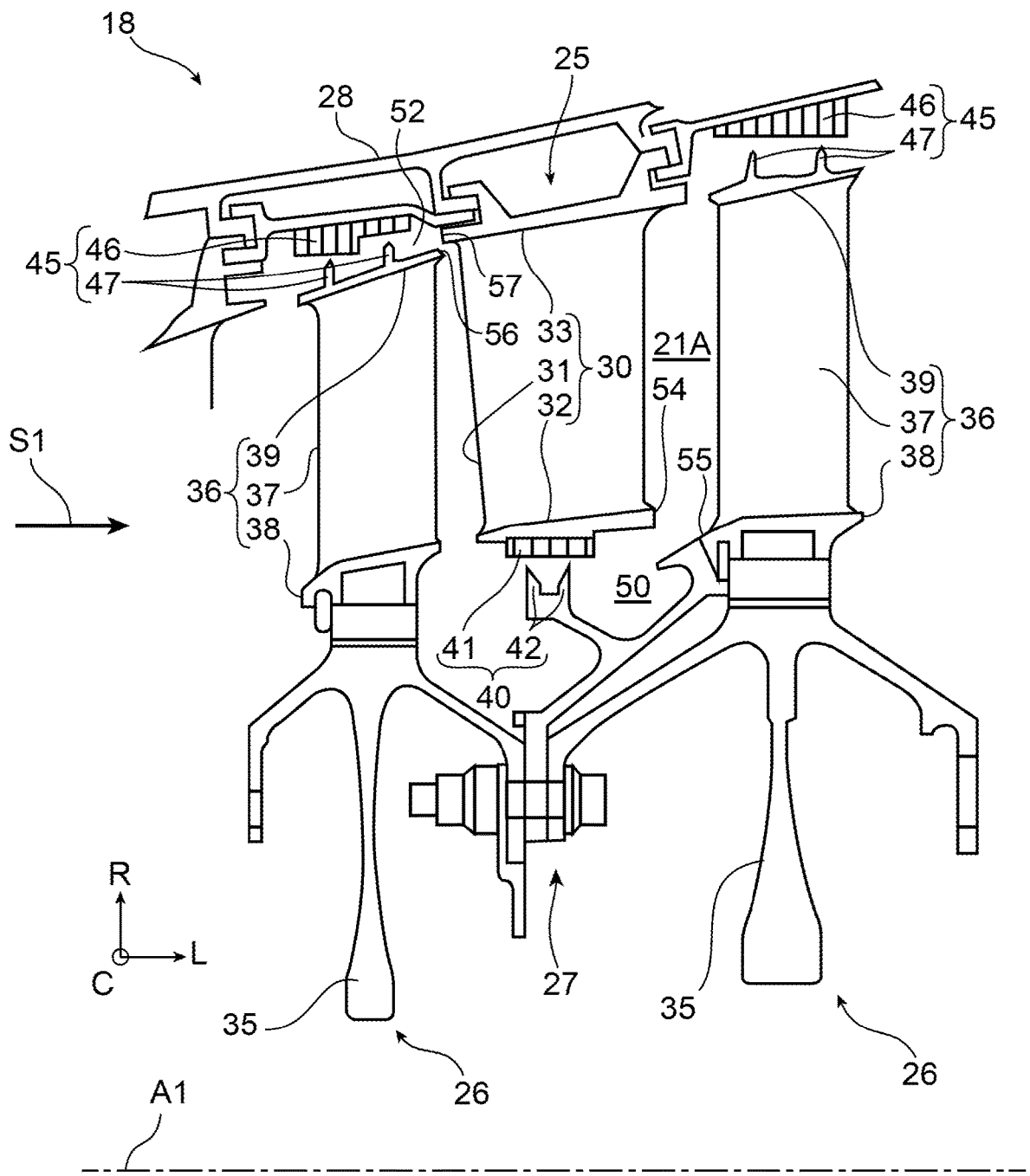
FIG. 4 is a diagrammatic, partial, axial sectional half-view of a turbine engine low-pressure turbine.

FIG. 4 shows a part of a turbine 18 of the same type as that in FIG. 3, centred on a nozzle 25, a rotor wheel 26 belonging to the same stage as this nozzle 25 (on the right in FIG. 4) and a rotor wheel 26 of a lower stage (on the left in FIG. 4).

In the example in FIG. 4, the turbine 18 comprises a dynamic seal 40 comprising, on the one hand, an abradable wear part 41 integral with the inner platform 32 of the blades 30 of the nozzle 25 and, on the other hand, knife edges 42 integral with the rotor wheels 26. The seal 40 is used to limit the flow of gas radially below the nozzle 25.

The turbine 18 in FIG. 4 further comprises dynamic seals 45, each comprising on the one hand an abradable wear part 46 integral with the casing 28 and, on the other hand, knife edges 47 integral with the outer platform 39 of the blades 36 of the rotor wheels 26. The seals 45 are used to limit the flow of gas radially above the rotor wheels 26.

The turbine 18 in FIG. 3 further comprises dynamic seals 40 and 45 of the same type to limit gas flow radially below the nozzles 25 and radially above the rotor wheels 26 respectively. Such dynamic seals 40 and 45 thus limit, but do not entirely prevent, all gas flow outside the primary duct 21A, in particular in view of the clearances that result from thermal expansion and from the relative motions of the various fixed and moving parts of the turbine 18.

With reference to FIG. 4, the spaces radially outside the primary duct 21A define various annular cavities including cavities 50 and 52 referred to here as "purge cavities".

In this example, the purge cavity 50 is radially outwardly delimited by a second surface of the inner platform 32 of the blades 30 of the nozzle 25 and axially upstream by the dynamic seal 40. For each blade 30, the second surface of the inner platform 32 is, in this example, radially opposite the first surface of this inner platform 32. Thus, the second surface of the inner platform 32 of each blade 30 delimits a circumferential portion of the purge cavity 50.

The purge cavity 50 is fluidly connected to the primary duct 21A by an annular opening extending axially and/or radially between a downstream end 54 of the inner platform 32 of the blades 30 of the nozzle 25 and an upstream end 55 of the inner platform 38 of the blades 36 of the rotor wheel 26 belonging to the same stage as the nozzle 25.

In the example shown in FIG. 4, the purge cavity 52 is radially inwardly delimited by a second surface of the outer platform 39 of the blades 36 of the rotor wheel 26 belonging to the stage below that of the nozzle 25. The purge cavity 52 is delimited axially upstream by the dynamic seal 45, the knife edges 47 whereof are integral with this rotor wheel 26. For each blade 36, the second surface of the outer platform 39 is, in this example, radially opposite the first surface of this outer platform 39. Thus, the second surface of the outer platform 39 of each blade 36 delimits a circumferential portion of the purge cavity 52.

The purge cavity 52 is fluidly connected to the primary duct 21A by an annular opening extending axially and/or radially between a downstream end 56 of the outer platform 39 of the blades 36 of the aforementioned rotor wheel 26 and an upstream end 57 of the outer platform 33 of the blades 30 of the nozzle 25.

In the examples shown in FIGS. 3 and 4, the turbine 18 comprises such a purge cavity 50 or 52 downstream of each dynamic seal 40 or 45, respectively.

Figure 5:
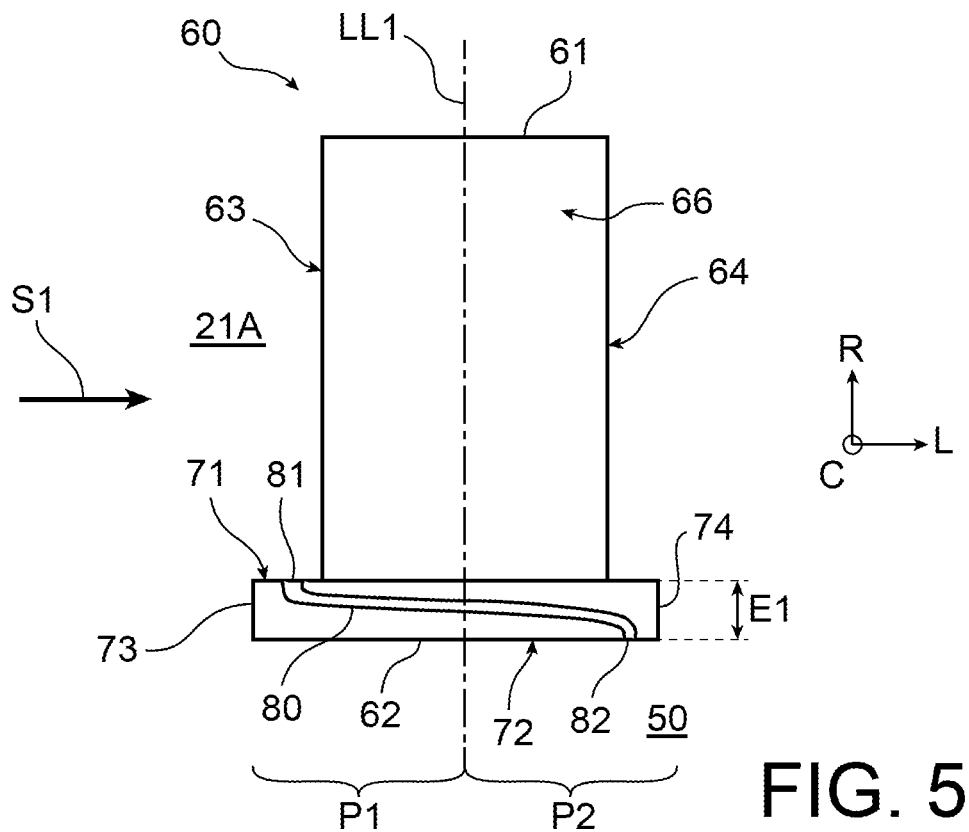
FIG. 5 is a simplified diagrammatic illustration of a part of a blade according to the invention, comprising a platform provided with an internal channel.

FIG. 5 shows a part of a blade 60 according to the invention.

The blade 60 comprises an aerofoil 61 and a platform 62.

In this non-limiting example, the blade 60 corresponds to one of the blades 30 of one of the nozzles 25 of the turbine 18 in FIG. 3 or 4, such that the platform 62 of the blade 60 corresponds to the inner platform 32 of this blade 30.

The aerofoil 61 of the blade 60 comprises a leading edge 63, a trailing edge 64, a pressure face (not shown) and a suction face 66.

The platform 62 of the blade 60 comprises a first surface 71 and a second surface 72 radially opposite one another and defining a thickness E1 of the platform 62.

The platform 62 comprises an upstream end 73 and a downstream end 74.

In the simplified, diagrammatic view shown in FIG. 5, the first surface 71 and the second surface 72 are planar and parallel to one another. It goes without saying that each of these surfaces can have a non-planar geometry and be oriented in an overall oblique direction relative to the longitudinal L and radial R directions, similarly to the platform 32 of the blade 30 in FIG. 4. In such a case, the first and second surfaces 71 and 72 more generally define a thickness E1 of the platform 62 at least at the upstream end 73 and/or the downstream end 74.

FIG. 5 shows an imaginary line LL1 located equidistant from the leading edge 63 and from the trailing edge 64 of the aerofoil 61 of the blade 60.

In the simplified, diagrammatic view shown in FIG. 5, the leading edge 63 and the trailing edge 64 are rectilinear and parallel to one another. It goes without saying that each of these edges can have a non-rectilinear geometry and be oriented in an overall oblique direction relative to the radial direction R, similarly to the leading edge of the aerofoil 31 of the blade 30 in FIG. 4. In general, the imaginary line LL1 is thus not necessarily straight.

The imaginary line LL1 delimits an upstream part P1 and a downstream part P2 of the platform 62.

When the blade 60 is fitted to one of the nozzles 25 of the turbine 18 in FIG. 3 or 4, the first surface 71 of the platform 62 radially inwardly delimits the primary duct 21A and the direction S1 of flow of the primary flow 20A is directed from the leading edge 63 towards the trailing edge 64 of the aerofoil 61 and from the upstream part P1 towards the downstream part P2 of the platform 62. Under these conditions, the second surface 72 of the platform 62 radially outwardly delimits the corresponding purge cavity 50 (see above). The platform 62 comprises an internal channel 80 having a suction opening 81 that opens out onto the first surface 71 of the upstream part P1 of the platform 62 and an ejection opening 82 that opens out onto the second surface 72 of the downstream part P2 of the platform 62.

In this example, the suction opening 81 of the internal channel 80 more specifically opens out upstream of the leading edge 63 of the aerofoil 61.

The invention encompasses any geometry of the internal channel 80 and of the suction opening 81 and ejection opening 82 provided that the internal channel 80 allows a part of the primary flow 20A to be taken from the primary duct 21A and ejected into the purge cavity 50 under the effect of the static pressure differential between this primary duct 21A and this purge cavity 50.

The invention is thus by no means limited to the examples shown in the figures.

For example, in embodiments not shown, the platform 62 comprises one or more further internal channels fluidly independent of or fluidly connected to the internal channel 80. Regardless of the number and geometry of the internal channels 80, the latter can comprise one or more suction openings 81 and one or more ejection openings 82.

FIGS. 6 to 9 show different types of suction openings 81, all of which, in these examples, open out onto the first surface 71 of the platform 62 downstream, in axial proximity to the leading edge 63 of the aerofoil 61.

Figure 6:
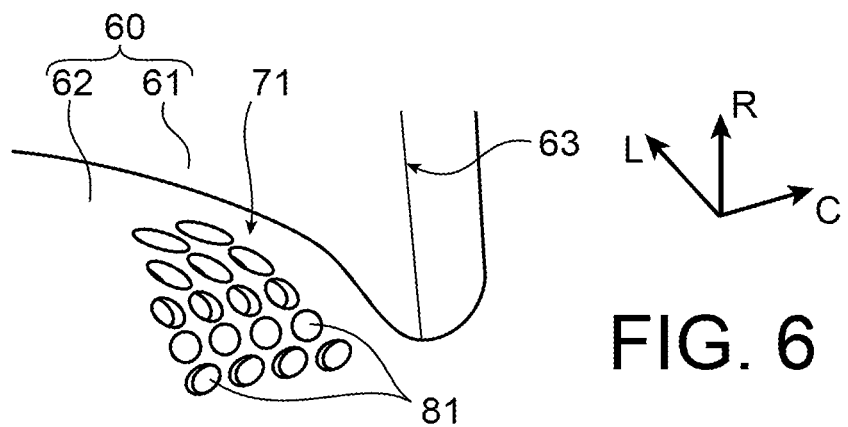
FIG. 6 is a diagrammatic, partial, perspective view of a blade according to the invention, showing suction openings according to a first embodiment.

In the example shown in FIG. 6, the platform 62 comprises an internal channel 80 with seventeen suction openings 81 of circular cross-section obtained, for example, by drilling or additive manufacturing.

Figure 7:
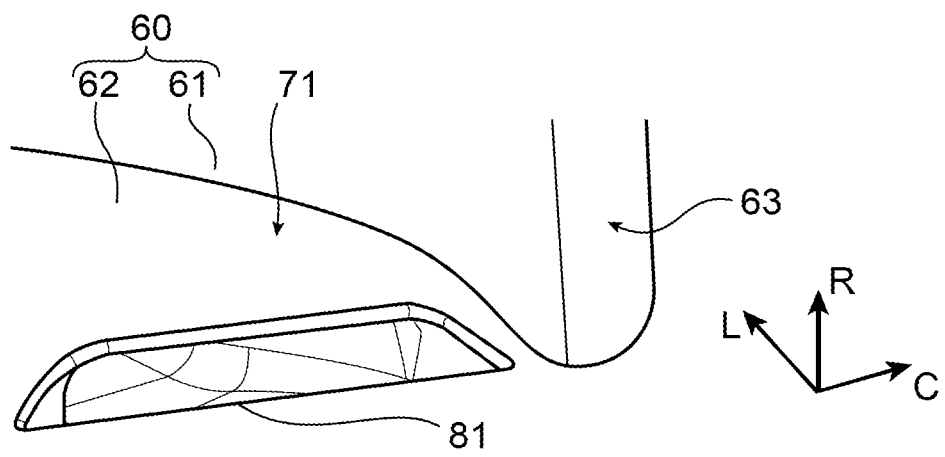
FIG. 7 is a diagrammatic, partial, perspective view of a blade according to the invention, showing a suction opening according to a second embodiment.

In the example shown in FIG. 7, the platform 62 comprises an internal channel 80 with a single suction opening 81 in the form of a groove extending in the circumferential direction C.

Figure 8:
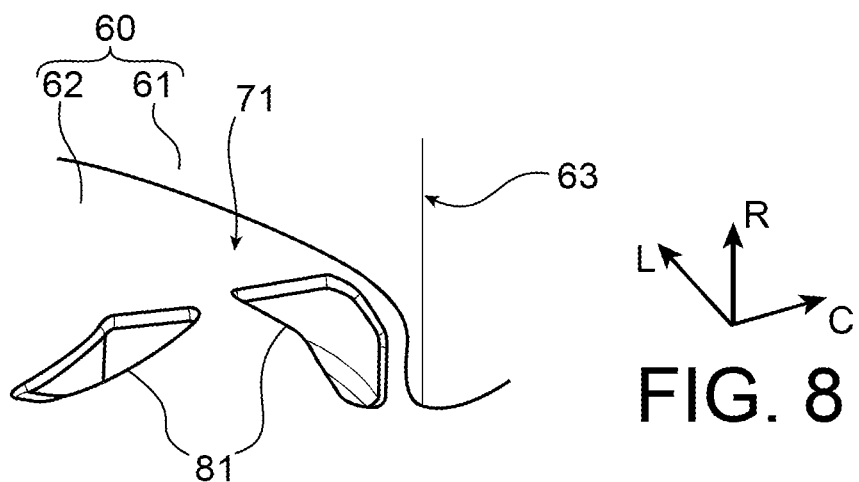
FIG. 8 is a diagrammatic, partial, perspective view of a blade according to the invention, showing suction openings according to a third embodiment.

In the example shown in FIG. 8, the platform 62 comprises an internal channel 80 with two suction openings 81 in the form of grooves extending in a curved direction so as to run along the pressure face of the aerofoil 61.

Figure 9:
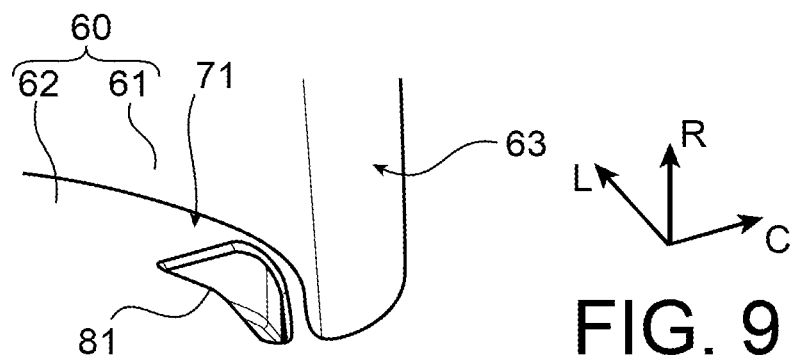
FIG. 9 is a diagrammatic, partial, perspective view of a blade according to the invention, showing a suction opening according to a fourth embodiment.

In the example shown in FIG. 9, the platform 62 comprises an internal channel 80 with a single suction opening 81 corresponding to one of the grooves in FIG. 8.

In one embodiment not shown, the blade 60 in FIG. 5 comprises vanes configured to orient, in an ejection orientation, the fluid exiting the internal channel 80 through the ejection opening 82.

The above applies by analogy to the blades 36 of the rotor wheel 26 of the turbine 18. Thus, in one embodiment, each of the blades 36 of the rotor wheels 26 of the turbine 18 comprises an aerofoil such as the aerofoil 61 of the blade 60 in FIG. 5 and an outer platform such as the platform 62 of the blade 60 in FIG. 5, such that the at least one internal channel 80 is configured to take a part of the primary flow 20A from the primary duct 21A and eject it into the corresponding purge cavity 52.

In another embodiment, the blades 30 of at least one nozzle 25 of the turbine 18 comprise an inner platform and an outer platform, both of which are similar to the platform 62 of the blade 60 in FIG. 5. Similarly, the blades 36 of at least one rotor wheel 26 of the turbine 18 can comprise an inner platform and an outer platform, both of which are similar to the platform 62 of the blade 60 in FIG. 5.

In another embodiment, one or more nozzles 25 and/or one or more rotor wheels 26 of the turbine 18 can comprise an alternation of conventional blades and blades comprising at least one platform such as the platform 62 of the blade 60 in FIG. 5.

The invention can also be implemented in the high-pressure turbine 17 and in a turbine of a turbine engine that is different from the turbofan engine 11 in FIG. 2.

What is claimed is:

1. A blade for a turbine of a turbine engine intended to be mounted about an axis, comprising an aerofoil and a platform, the aerofoil extending in a radial direction relative to said axis from the platform, the platform comprising a first surface from which the aerofoil extends and intended to delimit a primary duct into which the aerofoil extends in order to receive a fluid flowing in a direction from a leading edge to a trailing edge of the aerofoil, the platform comprising an upstream part in said direction and a downstream part in said direction, which are delimited by an imaginary line oriented mainly radially and equidistant from the leading edge and from the trailing edge of the aerofoil, the platform comprising a second surface radially opposite the first surface and intended to delimit a purge cavity, wherein the platform comprises at least one internal channel having at least one suction opening that opens out onto the first surface at the upstream part of the platform and at least one ejection opening that opens out onto the second surface at the downstream part of the platform, and wherein at least one of the one or more suction openings is positioned upstream of the leading edge of the aerofoil relative to the direction of fluid flow within the primary duct.

2. The blade according to claim 1, wherein at least one of the one or more suction openings is positioned, relative to the direction of fluid flow within the primary duct, downstream of the leading edge of the aerofoil and upstream of the trailing edge of the aerofoil.

3. The blade according to claim 1, wherein the platform comprises a plurality of internal channels fluidly independent of one another and/or a plurality of internal channels fluidly connected to one another.

4. The blade according to claim 1, comprising one or more vanes configured to orient, in an ejection orientation, a fraction of the fluid exiting the at least one internal channel of the platform through the one or more ejection openings.

5. The blade according to claim 1, wherein the at least one suction opening is disposed on the side of a pressure face of the aerofoil.

6. A turbine for a turbine engine, comprising a nozzle comprising at least one blade according to claim 1.

7. A turbine for a turbine engine, comprising a rotor, a stator and a dynamic seal, the rotor and/or stator comprising at least one blade according to claim 1, the dynamic seal comprising a wear part integral with the stator and at least one knife edge integral with the rotor, the turbine being configured such that the knife edge delimits upstream said purge cavity.

8. A turbine engine comprising a turbine according to claim 6.

9. A method for manufacturing a blade according to claim 1, comprising a step of additive manufacturing the blade.

10. A turbine for a turbine engine, comprising a nozzle comprising a rotor wheel comprising at least one blade according to claim 1.

* * * * *